United States Patent
Minakawa et al.

[11] Patent Number: 5,149,929
[45] Date of Patent: Sep. 22, 1992

[54] MICROWAVE OVEN WITH INVERTER CONTROLLED POWER SOURCE

[75] Inventors: Hiroshi Minakawa, Higashiosaka; Yoshikazu Kitaguchi, Kashiwara; Eiji Fukuda, Amagasaki, all of Japan

[73] Assignee: Sharp Kabushiki Kaisha, Osaka, Japan

[21] Appl. No.: 677,246

[22] Filed: Mar. 29, 1991

[30] Foreign Application Priority Data

Mar. 30, 1990 [JP] Japan .................................. 2-85445

[51] Int. Cl.⁵ .............................................. H05B 6/68
[52] U.S. Cl. .............................. 219/10.55 B; 315/105; 363/98
[58] Field of Search ............... 219/10.55 B; 315/105, 315/106, 107, 39.51; 363/98

[56] References Cited

U.S. PATENT DOCUMENTS

| | | | |
|---|---|---|---|
| 3,591,826 | 7/1971 | Valles | 219/10.55 B |
| 3,727,098 | 4/1973 | Crapuchettes | 315/39.51 |
| 4,164,685 | 8/1979 | Takahashi | 315/105 |
| 4,825,028 | 4/1989 | Smith | 219/10.55 B |
| 4,835,353 | 5/1989 | Smith et al. | 219/10.55 B |

*Primary Examiner*—Philip H. Leung
*Attorney, Agent, or Firm*—Birch, Stewart, Kolasch & Birch

[57] ABSTRACT

A microwave oven with an invertor control power source produces a microwave by the use of the magnetron in relation to the high frequency power generated by the invertor control power source. The heat sensitive ferreit beads provided on the lead wire for transmitting the high frequency power to the magnetron changes the inductance of the wire from the high level to the low level at around a threshold temperature lower than the working equilibrium temperature of the magnetron. The cathode filament current remains within the allowable range, and the moding of the magnetron is prevented. The magnetron can operate in a long life time.

7 Claims, 5 Drawing Sheets

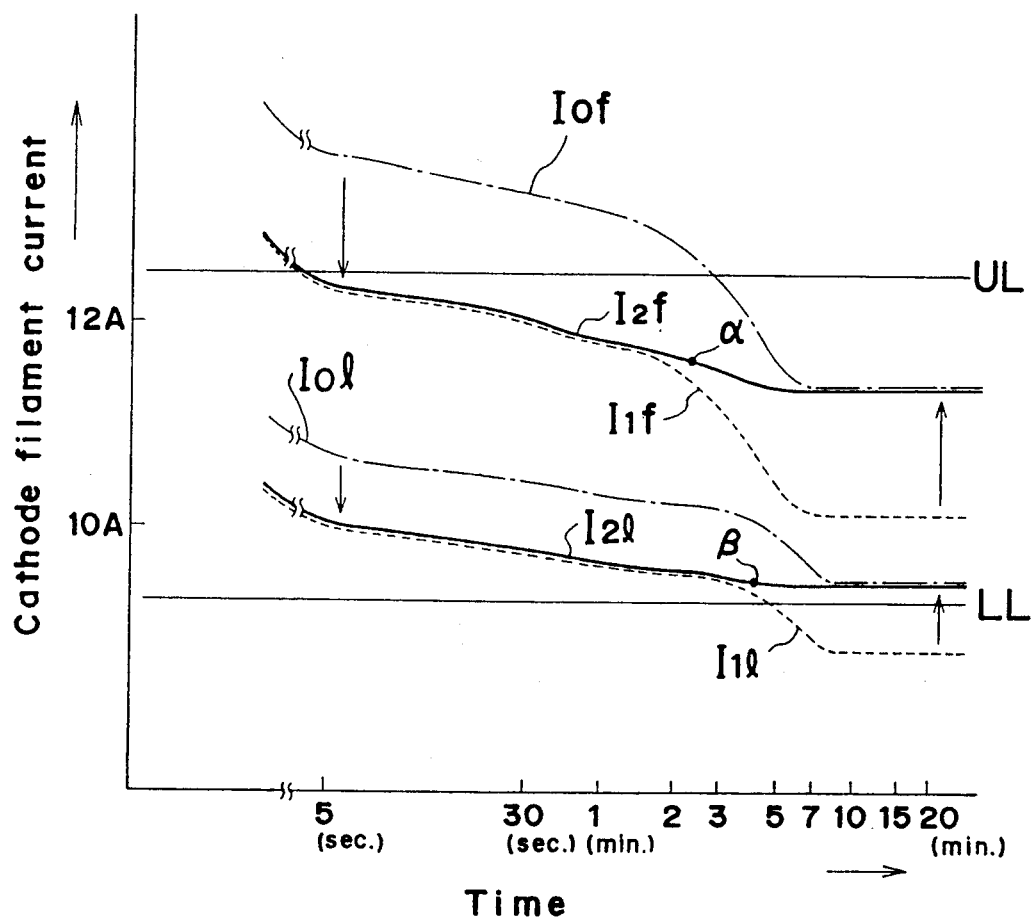

MICROWAVE OVEN WITH INVERTER CONTROLLED POWER SOURCE

BACKGROUND OF THE INVENTION

1. Field of the Invention

The present invention relates to a microwave oven with an inverter controlled power source and, more particularly, to a microwave oven being capable of adjusting the power to the magnetron at a level selected by the user.

2. Description of the Prior Art

In general, a microwave oven with an inverter control power source produces the high voltage power of high frequency (some tens of Kilo Hertz) and the cathode filament current for driving the magnetron. Simultaneously, the inverter controlled power source detects the high voltage power supplied to the magnetron and controls the high voltage power and the cathode filament current so that the high voltage power stays within an allowable range. Both the high voltage power and the cathode filament current are supplied to the magnetron through the high voltage coil of high voltage transformer and the driving coil for the cathode filament. The high voltage coil and the driving coil for the cathode filament are directly connected to a magnetron by the connecting wire, or a ferrite bead is provided around the connecting wire so as to provide an inductance for limiting the power supplied to the magnetron.

However, the magnetron generates heat by the power loss of the microwave as well as by receiving the reflected microwave due to the impedance unmatching with respect to the load inside the oven. The cooling fan is employed to cause the heated magnetron cool down so as to keep the magnetron working stably at a suitable temperature, hereinafter referred to as a "working equilibrium temperature".

According to FIG. 7, $I_1f$ and $I_1l$ in dotted lines show the cathode filament currents when the microwave oven with a conventional ferrite bead is operated under the maximum rated power and under the minimum rated power with slight load, respectively, and $I_0f$ and $I_0l$ in dashed lines show the cathode filament current when the microwave oven with no ferrite bead is operated under the maximum rated power and under the minimum rated power with a slight load, respectively. As apparent from the curve, a large current flows through the cathode filament of the magnetron just after the magnetron starts the operation. The current in the cathode filament is reduced until the oscillation becomes stable, i.e., during the temperature increase of the magnetron from the room temperature up to the working equilibrium temperature, at which the cathode filament current becomes stable. It is obvious, from FIG. 7, that the cathode filament current $I_0f$ exceeds the upper limit UL during the initial stage of operation under the maximum rated power in the case where the cathode filament driving coil is directly connected to the magnetron through a connecting wire.

When the cathode filament current $I_0f$ exceeds the upper limit UL, a lattice defect of the metallic material will be observed in the surface of the cathode filament which causes an abnormal oscillation or a so-called "moding" of the magnetron, resulting in a very short useful life of the magnetron.

On the other hands, the cathode filament current $I_1l$ falls below the lower limit LL during the operation under the minimum power with a slight load after reaching the working equilibrium temperature, in the case where the ferrite bead is mounted on the connecting wire to provide a predetermined inductance.

When the cathode filament current $I_1l$ falls below the lower limit LL, there will be a self heat generation by the microwave reflection due to a slight cooling load and insufficient thermal electrons which cause the moding of the magnetron, resulting also in a very short useful life of the magnetron.

Thus, the microwave oven of the art has a problem such that the life time of magnetron is shortened due to the excessive current just after the operation start or to the insufficient current after reaching the working equilibrium temperatures.

SUMMARY OF THE INVENTION

The object of the present invention is therefore to provide a microwave oven with an inverter controlled power source which solves these problems.

The present invention has been developed with a view to substantially solving the above described disadvantages and has for its essential object to provide an improved microwave oven with an inverter controlled power source.

In order to achieve the aforementioned objective, a microwave oven with an inverter control power source comprises a power transmitting means for supplying a high frequency power, a microwave generating means for producing microwave energy in relation to the high frequency power, the microwave generating means operating stably at a temperature above a working equilibrium temperature, and an impedance changing means mounted on the power transmitting means near the microwave generating means for changing an impedance of the power transmitting means between a first level impedance and a second level impedance. The first level impedance is established when the impedance changing means is heated below a predetermined threshold temperature. The second level impedance is established when the impedance changing means is heated above the threshold temperature. The threshold temperature is lower than the working equilibrium temperature.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 7 is a graph showing relationship between the cathode filament current and time of the microwave oven according to the present invention, in comparison with that of the prior art.

DETAILED DESCRIPTION OF THE PREFERRED EMBODIMENTS

Figure 3:
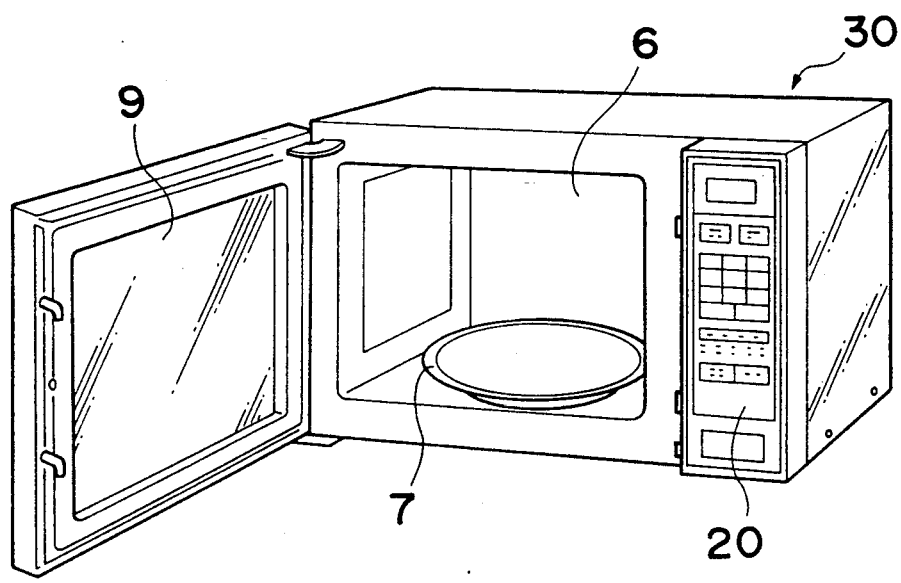
FIG. 3 is an schematic perspective view showing a front appearance of the microwave oven of FIG. 1.

Referring to FIG. 3, a microwave oven with a inverter controlled power source according to the present invention is shown. The microwave oven includes a rectangular box-like main body 30 having an opening at one side to define a cavity 6, a keyboard 20 for entering commands by a user, a door 9 including microwave shielding, and a turn table 7 for receiving a heating object.

Figure 1:
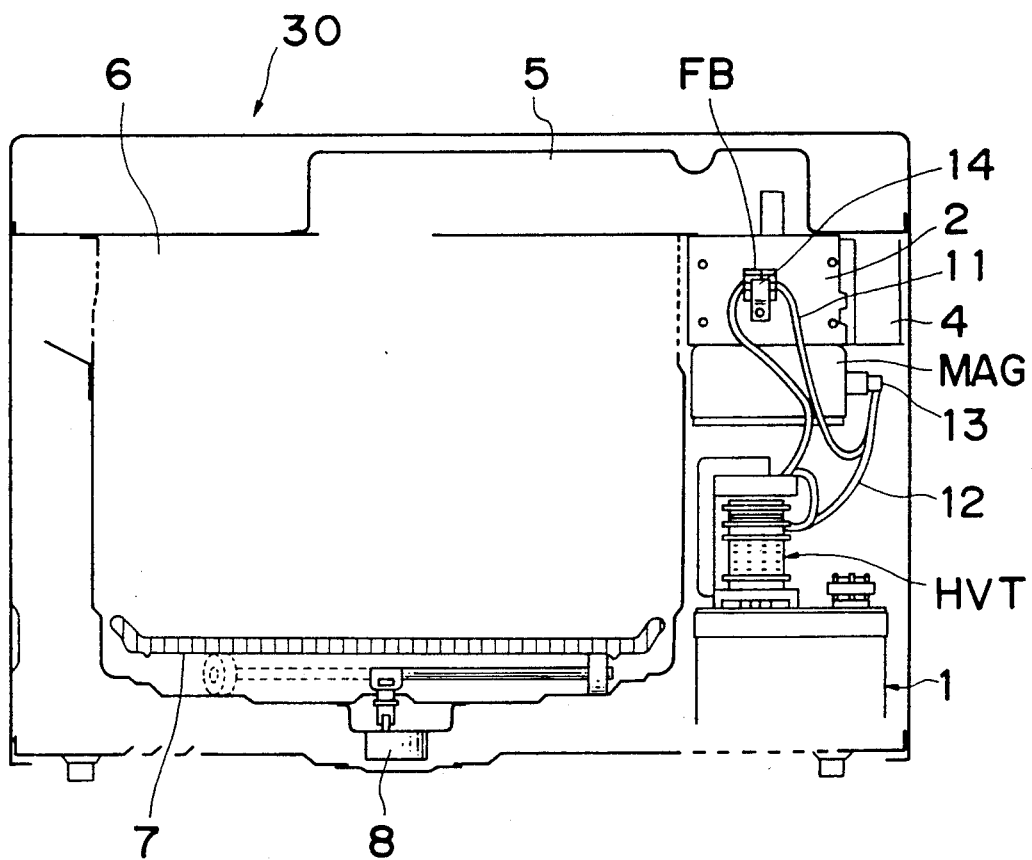
FIGS. 1 and 2 are illustrations showing an inner construction of the microwave oven according to the present invention.
Figure 2:
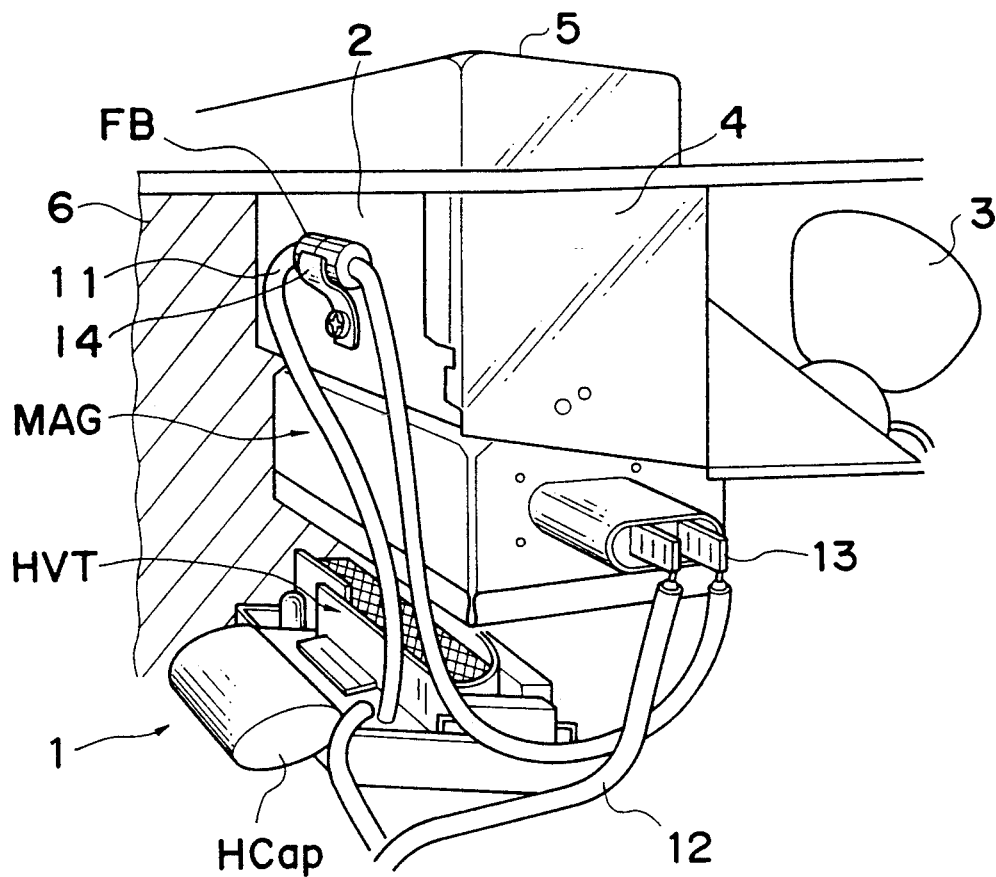

Referring to FIGS. 1 and 2, the inside structure of the microwave oven body 30 is schematically illustrated. In the back space of the keyboard 20, a power source 1 with an inverter control 1, a magnetron MAG, a fan 3 (FIG. 2) for cooling the magnetron MAG, an air duct 4 (FIG. 1) for guiding the cooling air flow generated by the fan 3 to the outside, a waveguide 5 for introducing microwave energy from the magnetron MAG into the cavity 6 are provided. A motor 8 for driving the turn table 7 is also provided at the bottom center of the cavity 6.

Figure 4:
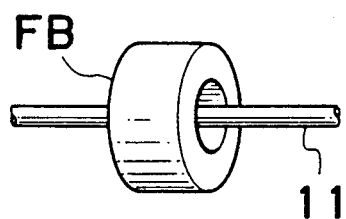
FIG. 4 is a perspective view showing a heat sensitive ferrite bead mounted on a high voltage wire of the microwave oven according to the present invention.
Figure 6:
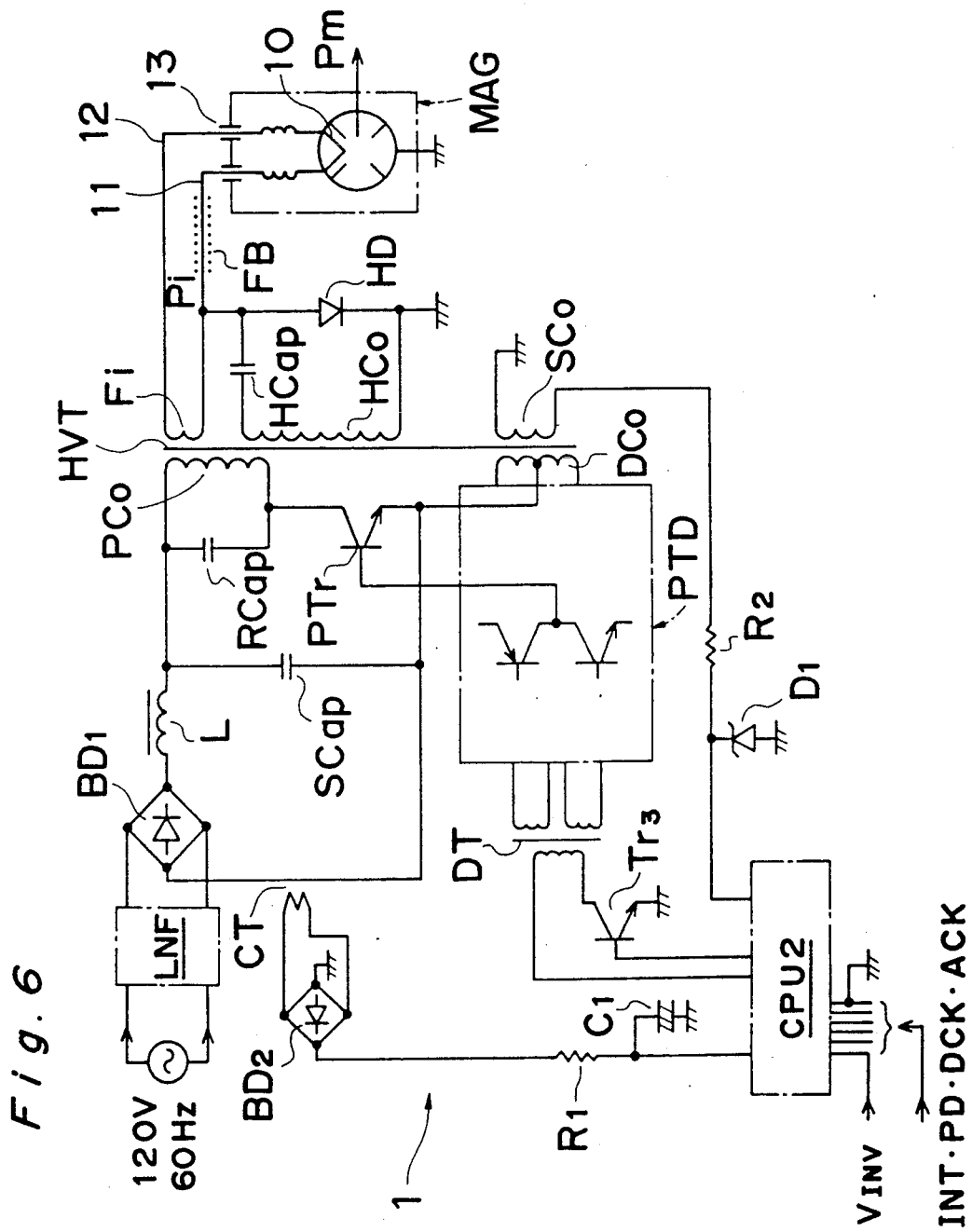
FIG. 6 is an electric circuit diagram showing the details of the microwave oven, according to the present invention.

Referring to FIG. 6, an electric circuit of the microwave oven according to the present invention is shown. The power source 1 includes a microcomputer CPU2 operated by the keyboard 20, an interface transistor $Tr_3$, a driving transformer DT, a power transistor $PT_r$, and a circuit PTD for driving the power transistor $PT_r$. A high voltage transformer HVT includes a primary coil $PC_o$ and a driving coil $DC_o$ wound on the primary side, and a coil Fi for driving a cathode filament 10, a high voltage coil $HC_o$, and a sensing coil $SC_o$ wound on the secondary side. The coil Fi is connected to the cathode filament 10 of the magnetron MAG by high voltage wires 11 and 12 via magnetron terminals 13. A high voltage capacitor HCap and a high voltage diode HD for rectifying a current from the coil $HC_o$ are connected with the first end of high voltage coil $HC_o$ in a series. The first end of high voltage coil $HC_o$ is further connected with a high voltage wire 11 of the high voltage transformer HVT via the high voltage capacitor Hcap. The second end of high voltage coil $HC_o$ is connected with the magnetron MAG through the ground. The high voltage wire 11 is inserted into temperature sensitive element, i.e. a heat sensitive ferrite bead FB, as shown in FIG. 4. The ferrite bead FB is fixed to a yoke 2 by a fixture 14, as shown in FIGS. 1 and 2.

Figure 5:
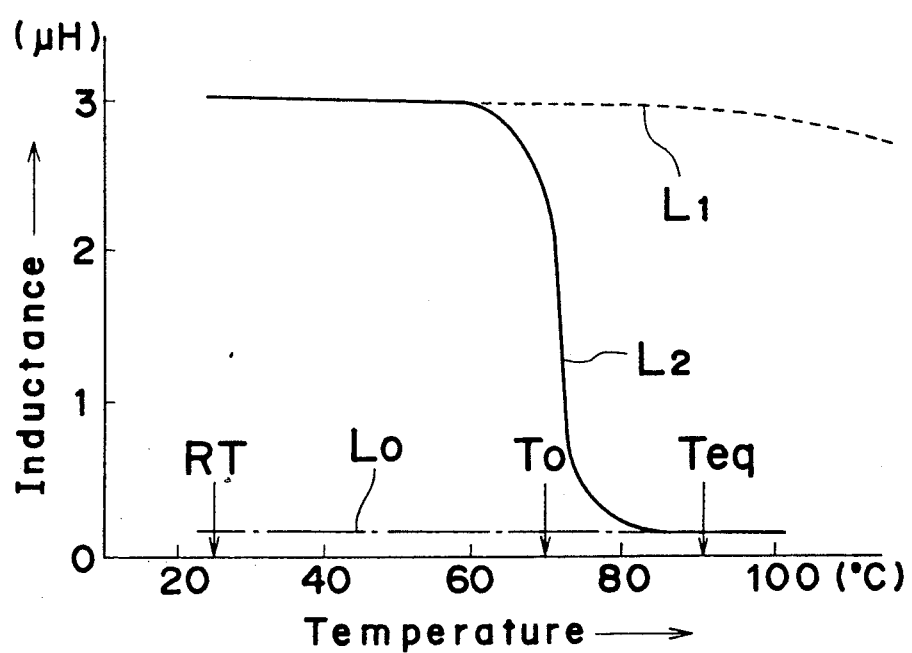
FIG. 5 is a graph showing the inductance change with respect to temperature change of the high voltage wire of FIG. 4 caused by the heat sensitive ferrite bead.

Referring to FIG. 5, relationship between temperature and inductance of the high voltage wire 11 connected to the magnetron MAG is shown.

The solid line $L_2$ represents the inductance in the high voltage wire 11 including the head sensitive ferrite bead FB according to the present invention. Line $L_2$ shows a change of about 3 $\mu$H at temperature between the room temperature, e.g., 25° C. and 60° C., rapidly decreases to nearly zero $\mu$H at about 70° C., and remains at a constant level of inductance thereafter. It is noted that the temperature at which the inductance becomes stable at the low level is the working equilibrium temperature $T_{eq}$ of the magnetron, and the temperature $T_0$ which is at about 70° C. is the threshold temperature of the ferrite bead FB. According to the preferred embodiment, the threshold temperature $T_0$ should be between about 60° C. and 80° C. The dotted line $L_1$ represents the inductance of the high voltage wire 11 including a conventional non-temperature sensitive ferrite bead having no threshold temperature between the room temperature RT and the equilibrium temperature $T_{eq}$. Line $L_1$ shows the same value of 3 $\mu$H as that of the solid line $L_2$ at the temperatures up to about 60° C. and is maintained at about level of 3 $\mu$H even in the temperature range between 60° C. and 100° C. A dashed line $L_0$ represents the inductance of the high voltage wire 11 without any ferrite bead FB.

In the preferred embodiment, for example $T_0$ is set at 70° C. and the inverter controlled power source 1 works at a frequency of some tens of Kilo Hertz. Therefore, the ferrite bead FB causes the high voltage wire 11 to produce an inductance of approximately 3 $\mu$H when the temperature at the magnetron MAG is between the room temperature RT and the threshold temperature $T_0$. When the temperature at the magnetron MAG is higher than the threshold temperature $T_0$, the heat sensitive ferrite bead FB causes the high voltage wire 11 to exhibit almost no inductance.

The inverter controlled power source 1, according to FIG. 6, produces the power for the microwave oven system from the commercial power supply of, e.g., 120 V at 60 Hz. The line from the commercial power supply is connected to a line noise filer LNF which is in turn connected to a bridge rectifier $BD_1$. The output of bridge rectifier $BD_1$ is connected to a choke coil L, and capacitor SCap. Thus, the commercial power is rectified to a direct current which is supplied to the power transistor $PT_r$. Furthermore, the rectifier bridge $BD_1$ is coupled with a current transformer CT which induces an alternating current which is fed to a bridge rectifier $BD_2$. A direct current as produced by the rectifier bridge $BD_2$ is applied to a resistor $R_1$, and in turn to a capacitor C1. Thus, the produced direct current is supplied to the microcomputer CPU2 for controlling the microwave oven. The microcomputer CPU2 drives an interface transistor $Tr_3$ and the power transistor driving circuit PTD according to the instructions from the keyboard 20.

The power transistor drive circuit PTD drives the power transistor $PT_r$, through a driving coil $DC_0$. The power transistor $PT_r$ generates a high frequency alternating current in the primary coil $PC_0$ of the high voltage transformer HVT to produce an induction power Pi of high frequency in the secondary coil $HC_0$ of the high voltage transformer HVT and also in the coil Fi for driving cathode filament 10. The induction power Pi is supplied through the wire 11 mounted with the heat sensitive ferrite bead FB to the magnetron MAG for producing a microwave power Pm. The microcomputer CPU2 detects the induction power Pi by the sensing coil $SC_0$ provided on the secondary side of the high voltage transformer HVT. A resistor $R_2$ and a diode $D_1$ are provided along a line between the sensing coil $SC_0$ and the microcomputer CPU2.

The microcomputer CPU2 controls each element in the inverter controlled power source 1 so that the induction power Pi stays within an predetermined allowable range, according to the detected induction power Pi.

Immediately after the microwave oven is turned on, the temperature of the magnetron MAG is at the room temperature RT. At this stage, because the inductance of the wire 11 is 3 $\mu$H and includes the ferrite bead FB, the current through the cathode filament 10 is reduced by 1 to 2 amperes, as compared with the current through wire 11 without the heat sensitive ferrite bead FB as shown in FIG. 1.

Referring to FIG. 7, the relationship between the current through cathode filament 10 and time is shown. $I_2f$ and $I_2l$ in solid lines shown the cathode filament currents in the case where the microwave oven with the heat sensitive ferrite bead FB according to the present invention is operated under the maximum rated power load, and in the case where the same is operated under the minimum rated power with a slight load, respectively.

When the magnetron starts its operation but is still at about the room temperature RT, the cathode filament current $I_2f$ according to the present invention remains under the die to limit UL because the cathode filament current $I_2f$ is reduced by 1 to 2 amperes, under the effect of the heat sensitive ferrite beads FB.

Furthermore, when the temperature of the magnetron MAG increases above the threshold temperature $T_0$, the heat sensitive ferrite bead FB causes the inductance change in the wire 11 to almost zero, resulting in coincidence of lines $I_2f$ and $I_2l$ with $I_0f$ and $I_0l$, respectively. Thus, even when the microwave oven is operated under the minimum power with a slight load, the cathode filament current $I_2f$ will not fall below the lower limit LL. It is to be noted that each of respective points $\alpha$ and $\beta$ on solid lines $I_2f$ and $I_2l$ represents specific points in which the magnetron MAG reaches threshold temperatures ($T_0$) under a maximum rated power and a minimum power with a slight load, respectively.

Thus, the microwave oven with the inverter power control according to the present invention can control the cathode filament current to be within a predetermined allowable range during the operation and realize improved useful life of the magnetron.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A microwave oven including an inverter controlled power source, said power source comprising:
   power supply means for supplying high frequency power to microwave generating means,
   microwave generating means coupled to said power supply means for generating microwave power in relation to said high frequency power, said microwave generating means operating stably at a temperature above a working equilibrium temperature;
   electrical conductor means of a predetermined impedance coupling said power supply means to said microwave generating means;
   temperature sensitive impedance changing means coupled to said electrical conductor means for changing said impedance between a first level impedance and a second level impedance in response to temperature, said first level impedance being established when said impedance changing means is heated below a predetermined threshold temperature, said second level impedance being established when said impedance changing means is heated above said threshold temperature, said threshold temperature being lower than said working equilibrium temperature.

2. A microwave oven as claimed in claim 1, wherein said inverter controlled power source additionally includes circuit means for monitoring and controlling said power supply means so as to keep said high frequency power within a predetermined allowable range.

3. A microwave oven as claimed in claim 2 wherein said circuit means for monitoring and controlling said power supply means includes a keyboard operated microcomputer.

4. A microwave oven as claimed in claim 1, wherein said microwave generating means comprises a magnetron.

5. A microwave oven as claimed in claim 4, wherein said electrical conductor means comprises a lead wire connected to said magnetron from said power supply means.

6. A microwave oven as claimed in claim 1, wherein said temperature sensitive impedance changing means comprises a heat sensitive ferrite bead.

7. A microwave oven as claimed in claim 6 wherein said heat sensitive ferrite bead encircles a portion of said electrical conductor means.

* * * * *